(No Model.) 3 Sheets—Sheet 1.

W. E. RICKARD.
TREE FELLING MACHINE.

No. 389,596. Patented Sept. 18, 1888.

Witnesses:
James Coleman
Chas. A. Mills

Inventor:
Wm. E. Rickard
by Wm. H. Babcock
Attorney (No Model.) 3 Sheets—Sheet 2.
W. E. RICKARD.
TREE FELLING MACHINE.
No. 389,596. Patented Sept. 18, 1888.
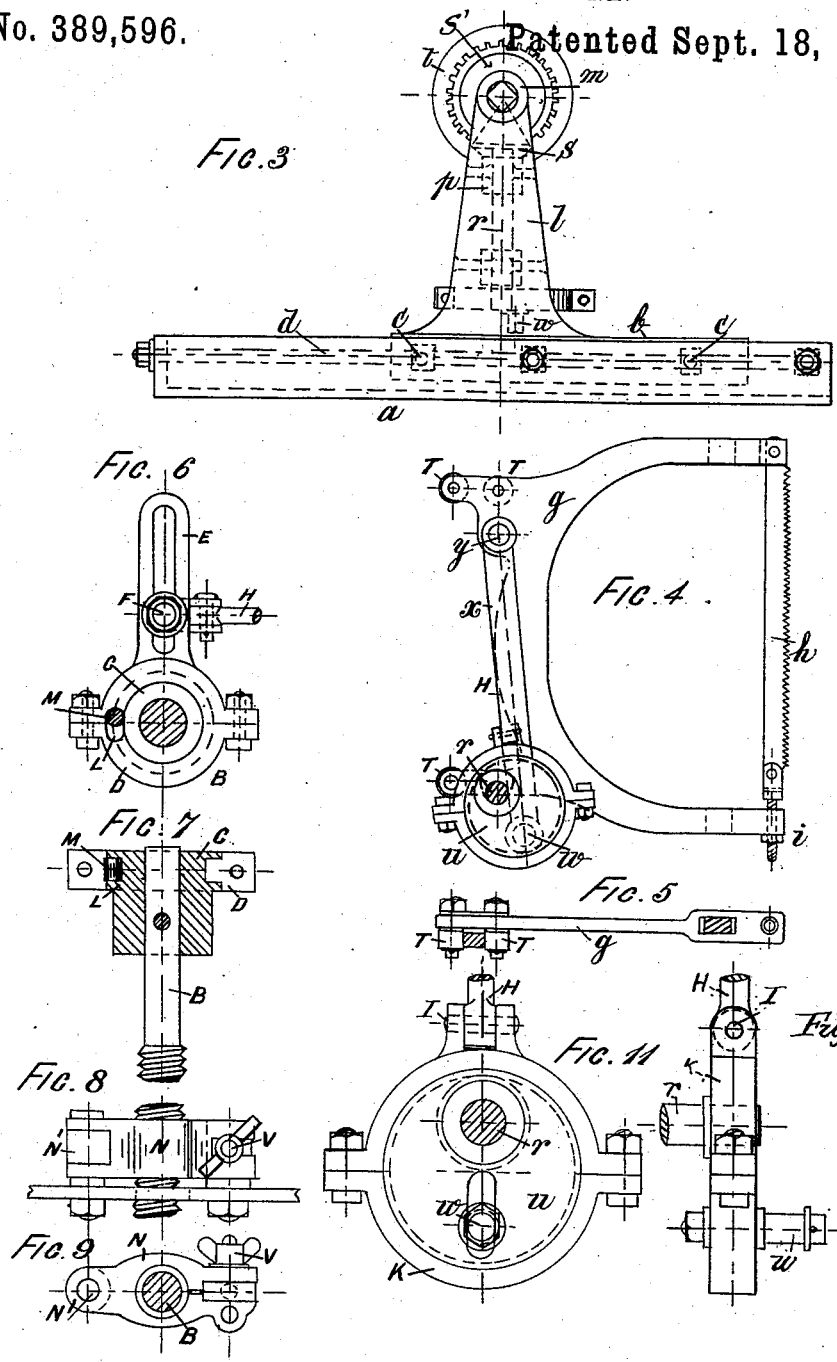
Witnesses:
James Coleman
Chas. A. Mills
Inventor:
Wm. E. Rickard
by Wm. H. Babcock
Attorney (No Model.)    3 Sheets—Sheet 3.
W. E. RICKARD.
TREE FELLING MACHINE.
No. 389,596.    Patented Sept. 18, 1888.
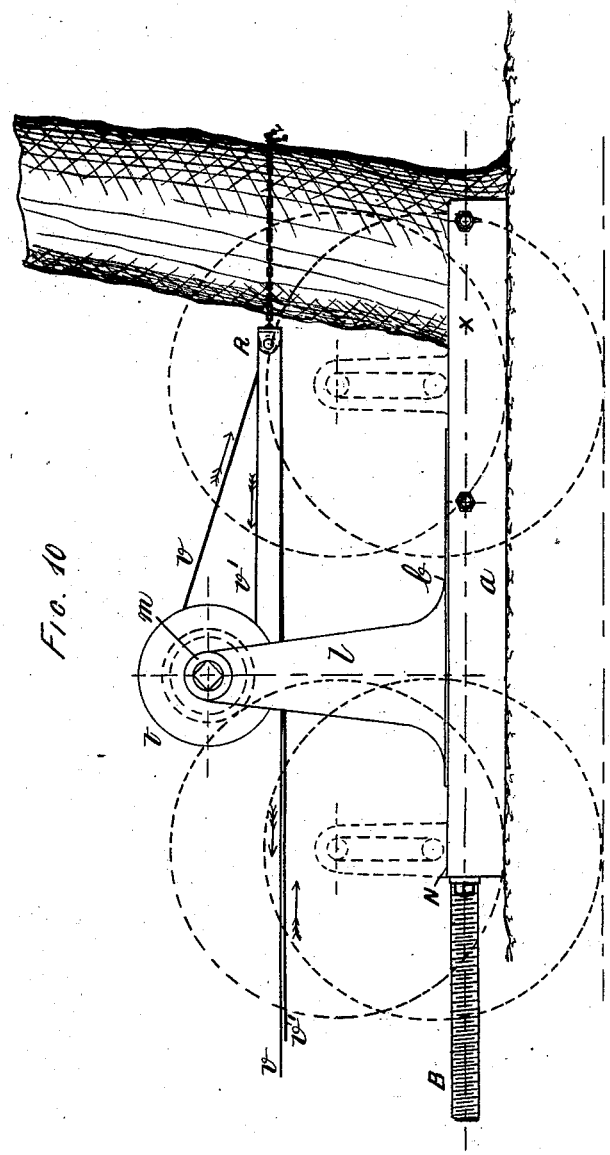

UNITED STATES PATENT OFFICE.

WILLIAM EDWARD RICKARD, OF LONDON, COUNTY OF MIDDLESEX, ENGLAND.

TREE-FELLING MACHINE.

SPECIFICATION forming part of Letters Patent No. 389,596, dated September 18, 1888.

Application filed September 26, 1887. Serial No. 250,768. (No model.)

*To all whom it may concern:*

Be it known that I, WILLIAM EDWARD RICKARD, engineer, a subject of the Queen of Great Britain, residing in London, in the county of Middlesex, England, have invented a certain new and useful Improved Tree-Felling Machine; and I do hereby declare the following to be a full, clear, and exact description of the invention, reference being had to the accompanying drawings, which form part of this specification.

My invention relates to improvements in tree-felling machines, in which a horizontally-reciprocating saw operates in connection with feeding apparatus, by which the saw is fed up against the tree which is to be felled.

The objects of my improvements are, first, to provide means by which the saw can be readily set in operation by horse or other power; second, to provide adjustable automatic feeding apparatus by which the feed forward of the saw can be readily altered and adjusted, and, third, to provide guides for the saw-frame upon which it reciprocates with little friction. I attain these objects by the mechanism illustrated in the accompanying drawings, (the details of which mechanism may be varied more or less, according to the circumstances in which the machine is to be used,) in which—

Figure 1:
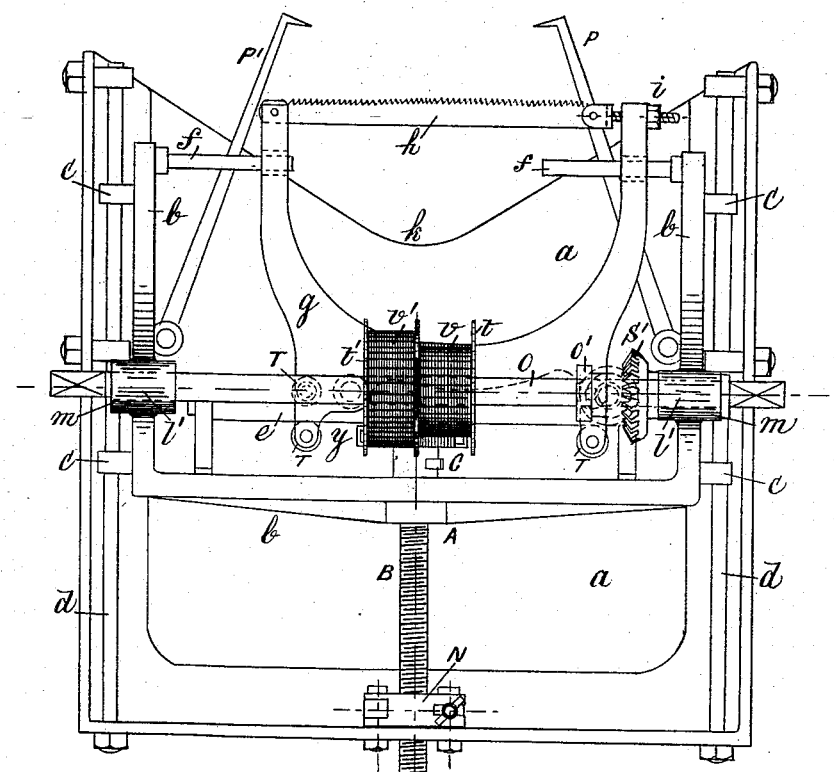
Figure 2:
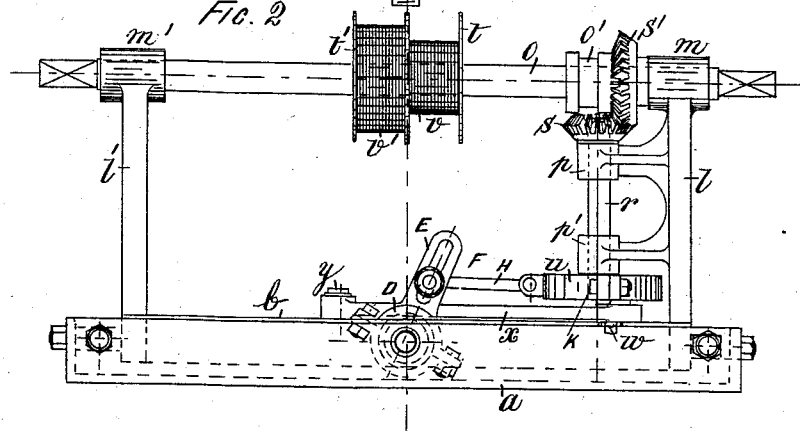

Figure 1 is a plan of the entire machine. Fig. 2 is a back view, and Fig. 3 a side view, of the same. Fig. 4 is a plan of the saw-frame; Fig. 5, a side view of the same. Fig. 6 is a back view, and Fig. 7 a horizontal section, of the feeding device and parts connected with it. Fig. 8 is a plan, and Fig. 9 a back view, of the nut through which the feed-screw works; Fig. 11, a plan on a larger scale; and Fig. 12, a side view of the crank and eccentric by which the saw-frame and the feed-screw, respectively, are operated. Fig. 10 is a side view of machine operating upon a tree.

Similar letters refer to similar parts throughout the several figures.

$a$ is a horizontal plate or foundation, which carries the rest of the machine, and may either rest upon the ground or may be provided with wheels, as shown in dotted lines in Fig. 10, the height of which can be adjusted. One or more pairs of wheels may be used.

$b$ is a horizontal frame, having guides $c\,c\,c\,c$, which fit and slide freely upon the horizontal bars $d\,d$, which are carried by the foundation plate or frame $a$. The frame $b$ also has fixed to it or formed upon it near the back a transverse guide-bar, $e$, Fig. 1, and two shorter guide-bars, $f\,f$, near the front, and upon these three guide-bars the saw-frame $g$ slides, so that it can reciprocate backward and forward across the machine. The saw itself, $h$, is fixed, in the usual way, to the front ends of the saw-frame $g$, being tightened up by a nut or key at $i$. The lower foundation-plate, $a$, is shown cut out at the front at $k$, Fig. 1, so that it may be brought close up to the tree which is to be cut down, as illustrated in Fig. 10.

The horizontal movable frame $b$ carries at each side a standard, $l\,l'$, at the upper end of which are bearings $m\,m'$, in which the transverse driving-shaft $o$ revolves freely, and one of the standards, $l$, also carries suitable bearings, $p\,p'$, for the vertical shaft $r$, upon the upper end of which is fixed a beveled toothed wheel, $s$, which gears with another beveled toothed wheel, $s'$, preferably of larger diameter, upon the driving-shaft $o$. A movable clutch or coupling of the usual kind is shown at $o'$, by which the wheel $s'$ can be disconnected from the shaft $o$ when desired.

$t\,t'$ are two drums fixed upon the driving-shaft $o$. Upon these drums two wire ropes, $v\,v'$, or other ropes, chains, or cords of sufficient strength, are coiled in opposite directions, so that when one is being unwound the other is wound up, and vice versa. If, therefore, the end of the coiled rope is pulled with sufficient force, it causes the shaft $o$, the toothed wheels $s\,s'$, and the vertical shaft $r$ to revolve. This revolution continues until the wire rope is unwound from the drum, by which time the other wire rope will have been wound up. The latter rope can be then pulled until the first is rewound, and so on as long as may be necessary. In order to pull the wire ropes, horse or other animal power is preferably used, the ends of the wire ropes being brought back and first passed round pulleys temporarily fastened to the tree, as shown in Fig. 10, and then attached to the harness of a horse, (for instance,) and the horse being then driven away in a straight line until the wire rope is unwound. The horse can then be brought back, or another horse can be harnessed to the end of the other wire rope, the first one returning with the end of the wire rope which is being wound up, and in this way a sufficiently constant revolution of the shaft $r$ is caused.

To the lower end of the shaft $r$ is keyed an eccentric, $u$, Figs. 2, 4, 11, and 12, upon the lower face of which is fixed a crank-pin, $w$, preferably fitted in a slot, as shown in Fig. 11, so that the length of its stroke can be altered. To this crank-pin is fitted one end of a connecting-rod, $x$, the other end of which is jointed at $y$ to the sliding saw-frame $g$. When, therefore, the shaft $r$ is made to revolve in the way just described, the saw-frame $g$ and saw $h$ are made to reciprocate backward and forward with sufficient speed against the tree which is to be cut down, as illustrated in Fig. 10, in which the dotted line X indicates the position of the saw.

At the back of the movable frame $b$ is a socket, A, Fig. 1, in which revolves a bar, B, to the front end of which is keyed a grooved disk, C, round which fits the loose strap D, upon which is formed or fixed the slotted arm E, carrying an adjustable pin, F, to which is jointed the connecting-rod H, the other end of which is jointed at I to the strap K of the eccentric $u$, already described. As the eccentric $u$ revolves, therefore, the arm E, and with it the strap D, is made to reciprocate backward and forward, the length of stroke depending upon the position of the pin F in the slot.

The loose strap D has formed in it a notch or recess, L, Figs. 6 and 7, wider at one end than at the other, into which is fitted a steel cylinder or roller, M, of such diameter that it is gripped between the disk C and the strap D at one end of the notch L, while it is perfectly free between them at the other end of the notch L. As, therefore, the strap D reciprocates backward and forward, as just described, it takes with it the disk C and bar B as it moves in one direction, but goes back without them in its return-stroke.

The outer end of the bar B is screwed and passes through a nut, N, fixed to the back of the frame $a$, this nut N being formed in two halves, which turn upon the center N', and can be instantly separated or screwed together by the screw V, as shown in Figs. 8 and 9, so that at any time, when desired, by opening the nut N the screwed bar B is released, and with the frame $b$ can be pushed backward and forward, while when the nut N is closed the screwed bar B is turned round intermittently and screwed forward by the action of the strap D and roller M upon the disk C, and the saw-frame $g$ and saw $h$ are consequently fed forward against the tree which is being operated upon, the speed of such feed being regulated by the position of the pin F in the slotted arm E.

The ends of the shaft $o$ are shown prepared to receive handles, by which the saw can be driven, or by which, when necessary, the wire ropes can be coiled upon the drums $t\ t$.

In order to operate the machine, it is brought up to the tree which is to be felled, to which it is temporarily attached by the hooks P P' upon the base $a$, as shown in Fig. 1, the frame $b$ being brought back to the nut N and the latter being then closed. The pulleys R are then fastened to the tree, as shown in Fig. 10, and the ends of the wire ropes $v\ v'$ are passed round them, one of the ropes being coiled upon its drum and the other being uncoiled. The free end of the coiled wire rope is then hauled away by horse or other power, the saw $h$ being thereby set in operation and cutting through the tree, against which it is fed as the depth of the cut increases by means of the feed-screw B, operated intermittently and automatically in the manner described. In the case of a small tree it will be cut through when or before the wire rope has been entirely unwound from its drum. If not, the rope which has been wound upon the other drum while the first was being unwound is hauled upon in turn and the operation continued until the tree is cut through.

I prefer to use the disk C, strap D, recess L, and roller M to effect the intermittent rotation of the feed-screw B in the manner described, as the amount of feed can be exactly adjusted; but an ordinary ratchet-wheel and reciprocating pawl of the well-known kinds may sometimes be used instead.

The saw-frame $g$ is provided at each side with friction-rollers T T T T, between which the transverse guide-bar $e$ passes freely, and also with openings in front, (with or without friction-rollers,) through which the guide-bars $f\ f$ pass, so that the frame $g$ reciprocates backward and forward with little friction, and the saw is kept in its proper position while working. By the use of the pulleys R the machine is kept up to its work by the tension of the wire rope, instead of being drawn away from it, and its action is greatly facilitated.

By the addition of wheels to the machine, as shown in dotted lines in Fig. 10, it is quickly and easily conveyed from place to place, as required.

Where there is little room for moving the machine, the frame may be provided with one or more short axles, which can be fitted with wheels which rest upon the ground when the machine is turned up upon one side or edge.

The improved machine may be used for crosscutting or otherwise sawing felled timber by suitably adjusting its position.

I am aware that reciprocating saws actuated by steam-power have been used prior to my invention for the purpose of felling trees, and I do not claim such sawing apparatus, broadly; but

What I claim as my invention, and desire to secure by Letters Patent, is—

1. In combination with feeding mechanism, a base provided with longitudinal guides, a frame sliding in said guides, bearings $m\ m'\ p$ $p'$, a driving-shaft turning in said bearings, toothed wheel S, carried by $r$ and engaging toothed wheel S', an eccentric carried by shaft $r$, and provided with a crank-pin, a connecting-rod and saw-frame reciprocated by said crank-pin, and guides for said saw-frame, substantially as set forth.

2. A driving-shaft and drums carried thereby, in combination with cords which wind on said drums, pulleys over which said cords pass, a chain extending from one of said pulleys to the other and adapted to pass around a tree, and mechanism for operating the saw, substantially as set forth.

3. In combination with a base and a frame sliding thereon, a feed-screw attached to said frame and turning freely therein, a fixed nut through which said feed-screw works, a peripherally-grooved disk carried by said feed-screw, a strap passing around said disk, a roller attached to said strap and fitting in the peripheral groove of said disk, a longitudinally-slotted arm carried by said strap, a pin adjustable in said slot, a jointed connecting-rod attached to said pin, a strap connected to said jointed rod, an eccentric around which said strap passes, a shaft on which said eccentric is mounted, and a main shaft and gearing, whereby said shaft and eccentric are driven, substantially as set forth.

In witness whereof I have hereunto signed my name in the presence of two subscribing witnesses.

WILLIAM EDWARD RICKARD.

Witnesses:
EDMUND EDWARDS,
ARTHUR E. EDWARDS.